Figure 1:
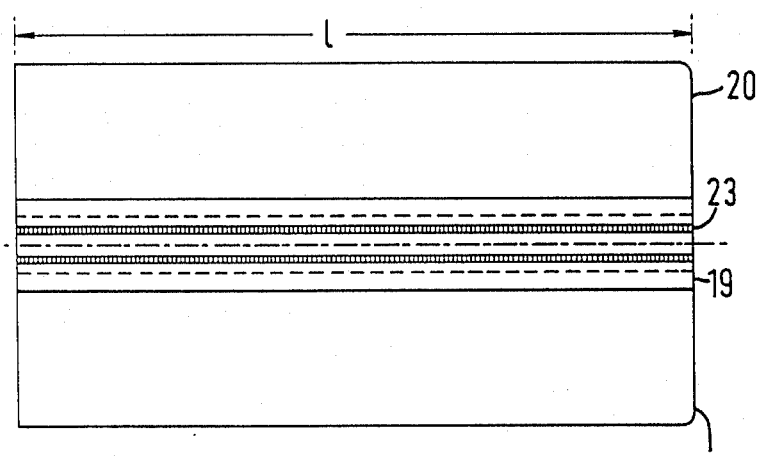

United States Patent [19]

Hamblin

[11] Patent Number: 4,767,544
[45] Date of Patent: Aug. 30, 1988

[54] ORALLY OPERABLE WATER FILTER

[75] Inventor: Michael J. Hamblin, East Markham, England

[73] Assignee: Rig Design Sevices, Limited, London, England

[21] Appl. No.: 924,322

[22] Filed: Oct. 29, 1986

[30] Foreign Application Priority Data

Nov. 1, 1985 [GB] United Kingdom ............... 8526976

[51] Int. Cl.⁴ ............................................ B01D 13/00
[52] U.S. Cl. ................................ 210/767; 210/321.72; 210/321.73; 210/416.3; 210/455; 210/484; 210/317
[58] Field of Search ................. 210/317, 321.1, 416.3, 210/455, 484, 497.2, 321.72, 321.73, 767; 422/101

[56] References Cited

U.S. PATENT DOCUMENTS

| 1,000,332 | 8/1911 | Dyer | 210/251 |
|---|---|---|---|
| 1,333,011 | 3/1920 | Crady | 210/251 |
| 3,327,859 | 6/1967 | Pall | 210/266 |
| 3,389,803 | 6/1968 | Barley | 210/266 |
| 3,567,028 | 3/1971 | Nose | 210/232 |
| 4,035,304 | 7/1977 | Watanabe | 210/495 |
| 4,564,452 | 1/1986 | Sharpe | 210/495 |

FOREIGN PATENT DOCUMENTS

| 3141388 | 9/1983 | Fed. Rep. of Germany . |
|---|---|---|
| 736405 | 11/1932 | France . |
| 42144 | 5/1933 | France . |
| 2558068 | 7/1975 | France . |
| 2080278 | 2/1982 | United Kingdom . |

OTHER PUBLICATIONS

Porter, M. C. et al, "Membrane Ultrafiltration", Chem. Tech., Jan. 1971, pp. 56–63.

Primary Examiner—Richard V. Fisher
Assistant Examiner—Coreen Y. Lee
Attorney, Agent, or Firm—Nixon & Vanderhye

[57] ABSTRACT

An orally operable water filter includes an outer covering formed of a flexible, water impervious material and which defines an elongate enclosure. A flexible microporous filter membrane, having a pore size of not more than one micron, is disposed within the elongate enclosure and divides the enclosure into respective fluid inlet and fluid outlet compartments, such that the outlet may be placed in the mouth of the user and the fluid inlet may be contacted with a source of water to be filtered by drawing the water through the filter using oral suction. Furthermore, the filter includes a flexible separator, disposed at least in the outlet compartment, for preventing the blocking of fluid over the surface of the filter membrane.

6 Claims, 2 Drawing Sheets

U.S. Patent  Aug. 30, 1988  Sheet 2 of 2  4,767,544
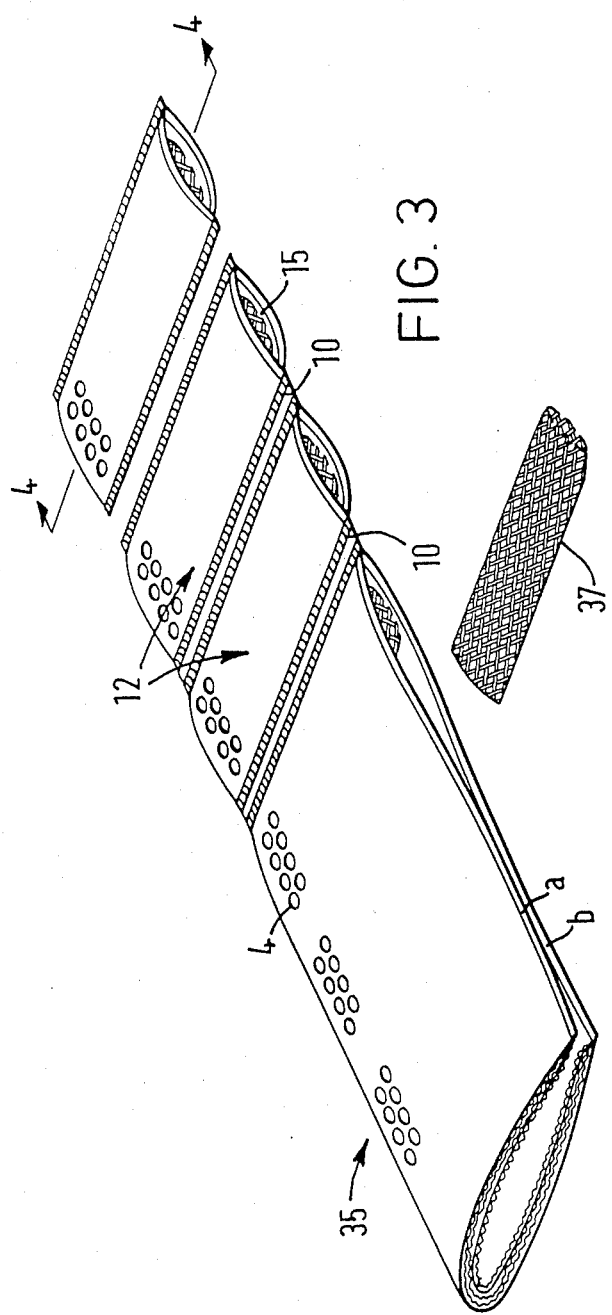
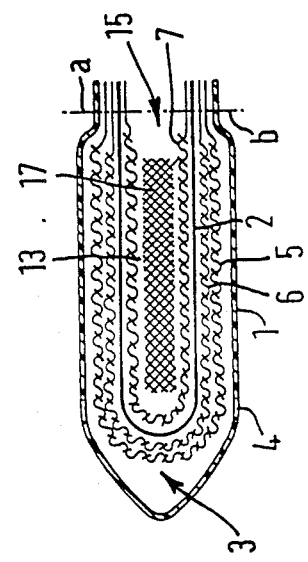

ORALLY OPERABLE WATER FILTER

This invention relates to water filters, and in particular to water filters which are operable by mouth. In particular, the invention relates to orally operable water filters which can be constructed simply and cheaply, such that after use, they may discarded and replaced.

Various proposals have previously been made for personal water filters, adapted to be operated by mouth, and of a suitable size as to be readily transportable by the user. For example, U.S. Pat. Nos. 1,333,011, 1,000,332, 3,389,803 and U.K. Patent Specification No. 2080278 all disclose examples of such filters.

Existing such devices essentially comprise a rigid outer container, containing a filtering medium. Such existing devices suffer from a number of disadvantages. Their major disadvantage is that their rigid structure imposes severe and practical limitations upon their usefulness to potential users. Typically, such users might be businessmen or the like, travelling in parts of the world in which the purity of water cannot be guaranteed. An important requirement for such users is that orally operable filters should be readily transportable, for example in a pocket, without the risk of damage. Existing filters do not readily lend themselves to construction in a flexible form, because of the nature of the filtering materials used, and the method of construction of the devices.

In accordance with a first aspect of the invention, there is provided an orally operable water filter, comprising:

an outer covering formed of a water impervious material, and defining an elongate enclosure, a flexible microporous filter membrane, having a pore size of not more than one micron, disposed within the elongate enclosure, and dividing the enclosure into respectively fluid inlet and fluid outlet compartments, a fluid inlet for the inlet compartment disposed proximate a first end of the enclosure, a fluid outlet for the outlet compartment disposed proximate a second end of the enclosure, such that the oulet may be placed in the mouth of a user, and fluid drawn through the filter by oral suction, wherein the filter includes flexible separator means disposed at least in the outlet compartment, for separating the filter membrane from an adjacent surface.

A filter in accordance with the present invention may be constructed easily and cheaply, by laying up a flexible microporous polymer sheet, having a pore size of not more than one micron, preferably not more than 0.5 micron, with at least one sheet of a water impervious covering material, welding the sheets together so as to form a flexible elongate enclosure, having inlet and outlet compartments, providing an inlet for the inlet compartment proximate a first end of the enclosure, providing an outlet for the outlet compartment proximate a second end of the enclosure, and providing flexible separator means at least in the outlet compartment for separating the filter membrane from an adjacent surface.

The use of a microporous membrane, and a flexible outer covering, means that an orally operable water filter can be produced which is not only cheap and convenient to manufacture, but also readily transportable without risk of damage. However, because of the flexibility both of the membrane, and the outer covering material, the possibility exists for the membrane to collapse on to an adjacent surface, for example a surface of an adjacent filter membrane, or of the outer covering material, thus blocking the flow of water through the filter membrane. For this reason, separator means are provided at least in the outlet compartment, and preferably also in the inlet compartment, to ensure free fluid flow over the filter membrane surface. The separator means may comprise any suitable means for preventing the filter membrane from clinging to the adjacent surface, and blocking fluid flow, for example a sheet of a gauze or mesh placed adjacent the filter membrane. In an alternative embodiment, the separator means may comprise a plurality of raised portions, for example ribs, formed on the surface adjacent the filter membrane, for example on the water impervious outer cover.

In order to increase the filtering surface available, the filter membrane preferably extends along substantially the whole of the length of the elongate enclosure, and it preferably defines an inner compartment, an outer compartment bounded by the water impervious material being formed around the inner compartment.

In a particularly preferred embodiment of the method of producing a filter in accordance with the invention, welding is carried out so as to form a pair of elongate welds between a filter membrane and the covering material, and a plurality of transverse welds are then formed, between the elongate welds, to define the elongate enclosures. In a further preferred embodiment, a multi-layer structure is produced comprising the filter material and the impervious material, of which the impervious covering material forms an outer layer, and in which a plurality of fluid inlets are disposed between the elongate welds, generally along a line parallel with them. The two elongate welds are then caused to overlie each other, before the transverse welds are formed. Thus, the outer covering is folded such that the inlets are disposed proximate the folded edge, and the transverse welds are formed such as to weld together at least two layers of filter membrane, and at least two layers of outer covering, along each transverse weld line, thereby defining an inner compartment bounded by the filter membrane, and an outer compartment bounded on the outside by the water impervious material, and on its inside by the filter membrane.

Separator materials, for example in the form of gauze or mesh, may be laid up with the filter membrane material and outer covering material.

Any suitable water-impermeable material may be utilised for the covering material, preferably one which can readily be welded utilising conventional thermal or ultrasonic welding techniques. Preferred examples are polyproylene, polyethylene, nylon, polyurethane, or woven or knitted fabrics treated with suitable waterproofing compounds.

The microporous filter material with a pore size not exceeding one micron, and preferably of 0.4 microns or less. Various materials are suitable, for example cellulose acetate, or fluorine-containing polymers. These two materials however suffer from the disadvantages that they are, respectively, relatively readily frangible, and difficult to weld. Accordingly, in a particularly preferred embodiment, the microporous filter sheet is a polyamide material. Polyamides have the additional advantage that they are hydrophilic, and therefore the initial pressure differential required before filtering takes place is reduced, as compared with other, more hydrophobic materials. This is particularly important for an orally operable filter, in which suction must be applied by mouth.

Figure 2:
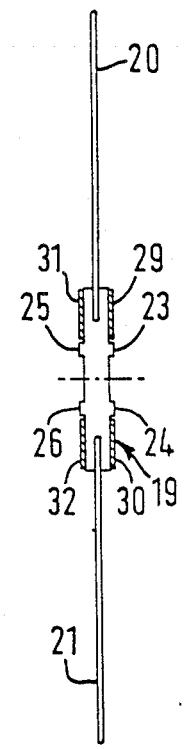

A preferred embodiment of the invention will now be illustrated with reference to the accompanying drawings, in which:

FIG. 1 is a plan view of a mandrel suitable for producing a water filter in accordance with the invention, FIG. 2 is an end view of the mandrel of FIG. 1, FIG. 3 is a perspective view illustrating a preferred method of construction, and FIG. 4 is a section on line 4—4 of FIG. 3.

Referring first to FIGS. 3 and 4, orally operable water filters are produced comprising an outer layer 1 of a polypropylene sheet, and a layer 2 of a polyamide microporous filter material (nypor 45, produced by Domnick Hunter Filters Limited, having a pore size of 0.45 microns). Sheets 1 and 2 define between them an inlet compartment 3 for water, and sheet 1 is provided with inlet holes 4, to enable foul water to enter compartment 3. Separators 5 and 6, of a 20 denier monofilament nylon mesh are provided within compartment 3 and a further separator 7 is provided within an inner compartment defined by filter sheet 2. Separator 7 is likewise formed of a 20 denier monofilament nylon mesh. Sheets 1, 2, 5, 6 and 7 are welded together along longitudinal weld lines "a" and "b".

Transverse welds 10, shown on FIG. 3, seal together all ten layers of material, so as to define elongate enclosures 12, each having an inner compartment 13, having a outlet 15 which can be sucked by mouth, and an outer compartment 3. A further separator 17 is then inserted into each compartment 13 through outlet 15. Thus, separators 17 and 7 serve to prevent the collapse of microporous membrane 2 onto the opposite microporous membrane surface, when suction is applied to outlet 15. Separators 5, 6 and 7 also carry out some coarse filtration.

The filter illustrated in FIGS. 3 and 4 may be conveniently manufactured utilising a mandrel as illustrated in FIGS. 1 and 2.

FIG. 2 illustrates a mandrel plate suitable for use in producing the filters in accordance with FIGS. 3 and 4. The mandrel plate of FIGS. 1 and 2 includes a central part 19, and two wings 20 and 21, secured in central part 19. Means are provided on the central part 19 for securing sheet plastics materials. In the embodiment illustrated, such securing means includes four magnetic strips 23, 24, 25 and 26 secured to the central part 19, and corresponding elongate magnetic strips (not shown) which may be fixed magnetically to strips 23, 24, 25 and 26, after the sheet material has been interposed. Immediately adjacent each magnetic strip 23, 24, 25 and 26 is a mould welding surface 29, 30, 31 and 32, to act as a support for an ultrasonic welding tool. The length L of the mandrel plate corresponds to the width in which the various sheet materials making up the filters are supplied by the manufacturers.

In use, the five layers shown in FIG. 4 which constitute a single side of the resulting filter, i.e. the outer covering layer 1, two separating layers 5 and 6, the microporous filter layer 2, and additional separating layer 7 are laid up with their edges parallel, and their edges are laid along magnetic strip 24. These sheets are then wrapped around wing 21, over magnetic strips 26 and 25 on the rear of the plate, and over magnetic strip 23. The sheets are trimmed to size such that their edges protrude a little way and over magnetic strip 23.

Magnetic clamping strips are then applied to each of magnetic strips 23, 24, 25 and 26, to secure the five layers in position.

An ultrasonic welding tool is then run along the outermost sheet, over the mould surfaces 29, 30, 31 and 32, so as to weld all five layers securely together along a longitudinal weld line. The sheets are then cut between strips 23 and 24, so as to produce two substantially identical elongate multi-layer pocket like structures, each of which has a cross-section substantially as illustrated in FIG. 4, except that the separator 17 is not yet present. The part 35 of FIG. 3 illustrates the appearance of the laid up sheets at this stage.

Each assembly of laid up sheets is then removed from the mandrel, and a series of tranverse welds 10 are formed, to produce a plurality of enclosures 12. An outlet for each enclosure 12 is provided by its mouth part 15, and inlets are provided by a plurality of holes 4, formed along lines generally parallel to the weld lines "a" and "b".

Finally a coarse but resilient flexible mesh tube 37 is placed inside each enclosure, to provide additional support to prevent collapse of the two surfaces of filter membrane 2.

In an alternative embodiment, a plurality of layers of microporous filter membrane may be provided, preferably having differing pore sizes.

Because all of the components of the filter device in accordance with the invention are flexible, the device can readily be carried without risk of damage either to the device, or the carrier. Furthermore, a plurality of filter devices in accordance with the invention may conveniently be packed into a suitable package or carrying pouch. In a preferred embodiment, each filter device may be sealed within an individual sterile compartment, such that filters may be extracted when need, and discarded after use.

The particular construction method in accordance with the invention enables the filters to be produced at minimum cost such that it becomes economic to discard them after use.

Although the microporous filter of the kind described above has been found to remove most noxious substances encountered in foul water, for example bacteria and some viruses, additional filtering materials may also be incorporated, for example activated carbon ion exchange resins and the like.

I claim:

1. An orally operable water filter, comprising an outer covering formed of a flexible, water impervious material, and defining an elongate enclosure,
    a flexible microporous filter membrane, having a pore size of not more than one micron, disposed within the elongate enclosure, and dividing the enclosure into respective fluid inlet and fluid outlet compartments,
    means defining a fluid inlet for the inlet compartment formed in the elongate enclosure and disposed proximate a first end of the enclosure,
    means defining a fluid outlet for the outlet compartment formed in the elongate enclosure and disposed proximate a second end of the enclosure, such that the outlet may be placed in the mouth of a user and the fluid inlet contacted with a source of water, to be filtered, and fluid drawn through the filter by oral suction,
    wherein the filter includes flexible separator means, disposed at least in the outlet compartment, for preventing the blocking of fluid flow over the surface of the filter membrane.

2. A filter as claimed in claim 1, including separator means in the inlet compartment for preventing the blocking of fluid flow to the surface of the filter membrane.

3. A filter as claimed in claim 1, wherein the separator means comprises a water permeable gauze or mesh disposed in the outlet compartment.

4. A filter as claimed in claim 1, wherein the filter membrane extends along substantially the whole of the length of the elongate enclosure.

5. A filter as claimed in claim 1, wherein the outlet compartment is an inner compartment bounded only by the filter membrane, and wherein the inlet compartment is an outer compartment bounded on its outside by the water impervious material, and on its inside by the filter membrane.

6. A method of obtaining a supply of drinking water comprising:
  (1) providing an orally operable water filter, comprising,
  an outer covering formed of a flexible water impervious material, and defining an elongate enclosure,
  a flexible microporous filter membrane, having a pore size of not more than one micron, disposed within the elongate enclosure, and dividing the enclosure into respective fluid inlet and fluid outlet compartments,
  means defining a fluid inlet formed in the elongate enclosure and disposed proximate a first end of the enclosure,
  means defining a fluid outlet for the outlet compartment formed in the elongate enclosure and disposed proximate a second end of the enclosure, such that the outlet may be placed in the mouth of a user and the fluid inlet contacted with a source of water, to be filtered, and fluid drawn through the filter by oral suction, and
  flexible separator means, disposed at least in the outlet compartment, for preventing the blocking of fluid flow over the surface of the filter membrane;
  (2) immersing the said fluid inlet in water which it is desired to filter,
  (3) inserting the said fluid outlet in the mouth of the user, and
  (4) applying oral suction to draw filtered water through the filter and into the mouth of the user.

* * * * *